T. M. TATE.
Road-Scrapers.

No. 146,958.  Patented Jan. 27, 1874.

Witnesses:
G. Matthys
C. A. Pettit

Inventor:
Thomas M. Tate
Per
Attorneys.

UNITED STATES PATENT OFFICE.

THOMAS M. TATE, OF LONGVIEW, TEXAS.

IMPROVEMENT IN ROAD-SCRAPERS.

Specification forming part of Letters Patent No. 146,958, dated January 27, 1874; application filed November 4, 1873.

*To all whom it may concern:*

Be it known that I, THOMAS M. TATE, of Longview, in the county of Upshur and State of Texas, have invented a new and Improved Road-Scraper; and I do hereby declare that the following is a full, clear, and exact description of the same, reference being had to the accompanying drawing forming a part of this specification, in which—

Figure 1:
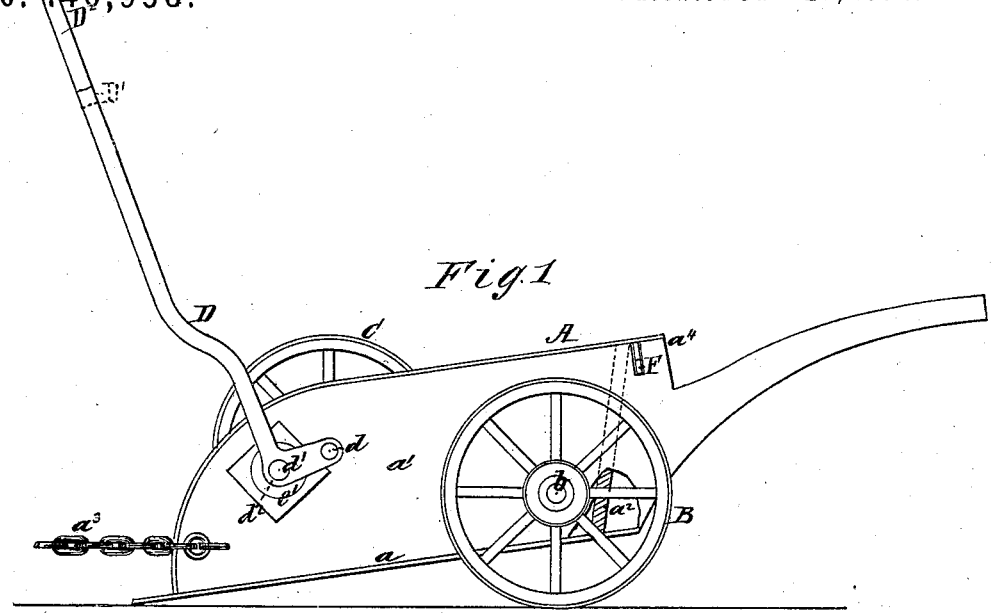
Figure 2:
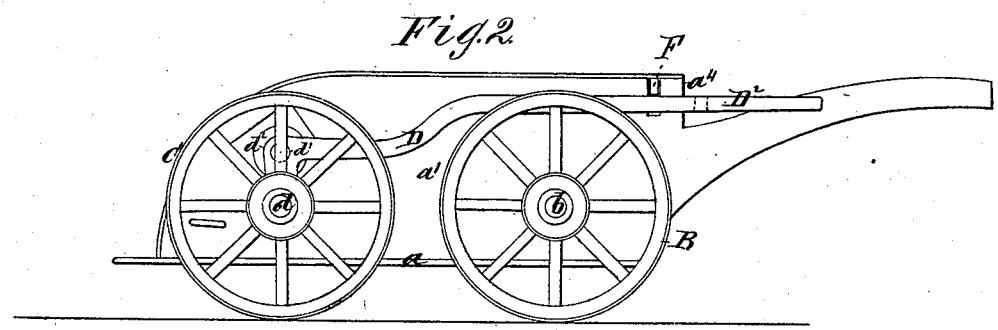
Figure 3:
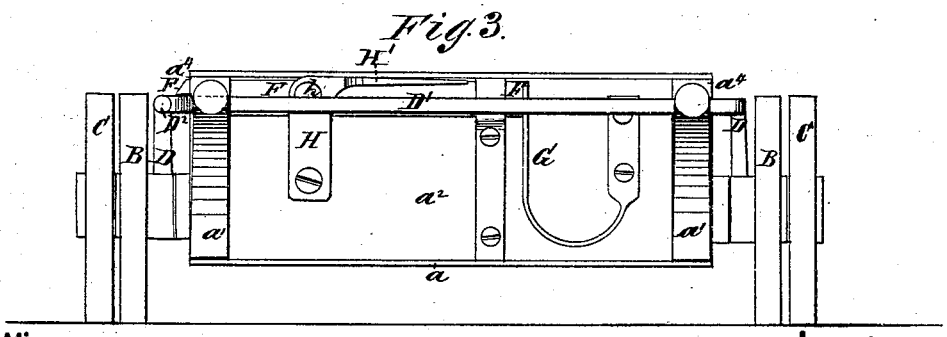

Figure 1 is a side elevation, one front wheel being taken away. Fig. 2 is also a side elevation, showing another position from that in Fig. 1. Fig. 3 is an end view.

The invention relates to the construction of road-scrapers so that they can be loaded with more facility, drawn with less animal power, and made to perform a greater amount of work in a given time than those now known to the public.

The invention will first be fully described, in connection with all that is necessary to a full understanding thereof, and then clearly pointed out in the claims.

A represents the scraper, having a metallic bottom, $a$, with sides $a^1$ $a^1$ and rear $a^2$ made of wood, and with front chain $a^3$, to which a horse may be attached. The rear wheels B B rotate on the journals $b$ $b$ projecting externally from the sides $a^1$ $a^1$. C C are front wheels rotating on journals $d$ of levers D, which have a pivot, $d^1$, or fulcrum at the vertex $d^2$ of their angle, the said fulcrum turning in a bearing, $e'$, attached to side of scraper. The two levers are connected by a cross-bar, $D^1$, which passes over the shoulders $a^4$, are provided with a handle, $D^2$, and are prevented from rising by a latch, F, that is held forward by a rear spring, G, and operated by an angle-lever, H, to which it is laterally attached at $h$.

The operation is as follows: When scraping up the dirt, the levers are thrown forward so as to lift the front wheels above the bottom of scraper, and, when the load is ready to be transferred to its destined place of deposit, are brought behind the shoulders $a^4$, and locked by the spring-latch. The load, being now relieved altogether of sliding friction, may be easily moved with a single horse. By placing the thumb under the bar $D^1$, and pressing the fingers on the arm H' of lever H, the lever D may be readily released from the spring-latch.

My invention is more simple and more easily operated than the ordinary road-scraper. One horse will do with it one and a half times as much work as two horses with the ordinary road-scraper, while the work will be performed with more ease.

The scraper fills more easily by allowing the hind wheels to rest on the ground. When loaded, the draft is comparatively light and easily moved by one horse. The same advantages exist when operated on a "dump" as when operated on level ground. In going down a dump or bank, it is only necessary to raise the lever which lets the front of the scraper down, thereby protecting the team from injury.

The load can be moved up an embankment with the same team required to move it on level ground, and with but little additional effort.

My improved scraper admits, and renders perfectly easy, the accomplishment of a "haul" of one hundred feet every three minutes, and with one-half the team used heretofore, carrying precisely the same load.

Having thus described my invention, what I claim as new, and desire to secure by Letters Patent, is—

1. The combination, with a road-scraper, of two front wheels, movable to let them below or carry them above the bottom of scraper, as and for the purpose described.

2. The end angled-levers D D, having journals $d$ and fulcrum-pivots $d'$, combined with wheels C and bearings $e'$ in the sides $a^1$ $a^1$ of the scraper, as and for the purpose described.

3. The levers D D, connected by bar $D^1$, combined with shoulders $a^4$ on scrapers, and a spring-latch working therethrough, as and for the purpose specified.

4. The combination, with latch F held forward by a spring, of the cross-bar $D^1$ and the arm H' of the latch-lever, as and for the purpose described.

THOMAS M. TATE.

Witnesses:
R. B. L. COY,
B. BUTTRILL.